United States Patent
Landvik et al.

(10) Patent No.: US 6,541,094 B1
(45) Date of Patent: *Apr. 1, 2003

(54) LAMINATED VISCO-ELASTIC SUPPORT

(75) Inventors: Dag Landvik, Saltsjo-Duvnas (SE); Michael B. Allaway, Paris (FR)

(73) Assignee: Tempur World, Inc., Lexington, KY (US)

( * ) Notice: Subject to any disclaimer, the term of this patent is extended or adjusted under 35 U.S.C. 154(b) by 14 days.

This patent is subject to a terminal disclaimer.

(21) Appl. No.: 09/703,893

(22) Filed: Nov. 1, 2000

(Under 37 CFR 1.47)

Related U.S. Application Data

(63) Continuation of application No. 08/458,968, filed on Jun. 2, 1995, now Pat. No. 6,159,574.

(30) Foreign Application Priority Data

Jun. 3, 1994 (GB) ............................................. 9411120
Jun. 9, 1994 (GB) ............................................. 9411504

(51) Int. Cl.⁷ ................................................. B32B 3/00
(52) U.S. Cl. ...................... 428/71; 428/217; 428/316.6; 428/319.3; 428/315.9; 442/221; 442/370
(58) Field of Search ....................... 428/71, 217, 316.6, 428/319.3, 315.9; 442/221, 370

(56) References Cited

U.S. PATENT DOCUMENTS

| | | |
|---|---|---|
| 3,000,020 A | 9/1961 | Lombard et al. |
| 3,047,888 A | 11/1962 | Schecter et al. |
| 3,833,259 A | 9/1974 | Pershing |
| 3,906,137 A | 9/1975 | Bauer |
| 3,939,508 A | 2/1976 | Hall et al. |
| 4,086,675 A | 5/1978 | Talbert et al. |
| 4,190,697 A | 2/1980 | Ahrens |
| 4,254,991 A * | 3/1981 | Venieris ...................... 297/345 |
| 4,379,856 A | 4/1983 | Samaritter et al. |
| 4,580,301 A | 4/1986 | Ludman et al. |
| 4,755,411 A | 7/1988 | Wing et al. |
| 4,808,469 A | 2/1989 | Hiles |
| 4,840,430 A | 6/1989 | Shimada |
| 4,843,662 A | 7/1989 | Handelman |
| 5,031,261 A | 7/1991 | Fenner, Sr. |
| 5,189,747 A | 3/1993 | Mundy et al. |
| 5,230,947 A | 7/1993 | Ou |
| 5,294,181 A | 3/1994 | Rose et al. |
| 5,522,106 A * | 6/1996 | Harrison et al. ................ 5/653 |
| 5,855,415 A | 1/1999 | Lilley, Jr. |

FOREIGN PATENT DOCUMENTS

| | | |
|---|---|---|
| DE | 1654301 | 3/1971 |
| DE | 3321720 | 12/1984 |
| FR | 2598910 | 11/1987 |
| IT | 1238272 | 7/1993 |
| IT | 00224783 | 6/1996 |
| JP | 62-183790 | 8/1987 |
| JP | 3128006 | 5/1991 |

OTHER PUBLICATIONS

Translation of JP–62–183790, Ida et al, Cushion seat, Feb. 7, 1986, 10 pages.*

Translation of IT–1238272, Gianluigi Marzetti, Filling for Cushions and Mattresses, Jul. 12, 1993, 4 pages.*

* cited by examiner

*Primary Examiner*—Terrel Morris
*Assistant Examiner*—Nai Vo
(74) *Attorney, Agent, or Firm*—Michael Best & Friedrich LLP

(57) ABSTRACT

A laminated support for pressure-relief comprising an upper layer of visco-elastic foam, a middle layer of visco-elastic foam having a greater hardness, and a bottom layer of highly resilient polyurethane foam. These layers are sandwiched between two layers of reticulated filter polyurethane foam.

2 Claims, 2 Drawing Sheets

LAMINATED VISCO-ELASTIC SUPPORT

CROSS-REFERENCE TO RELATED APPLICATION

This application is a continuation of U.S. patent application Ser. No. 08/458,968 which was filed on Jun. 2, 1995, now U.S. Pat. No. 6,159,574 the entire contents of which are incorporated herein by reference.

BACKGROUND OF THE INVENTION

1. Technical Field

The invention relates to mattresses and cushions, and more particularly to supports made of visco-elastic material.

2. Related Prior Art

Mattresses and cushions used every day in homes and hospitals are not well-suited for people requiring pressure-relief. In hospitals, for example, long-term patients often suffer from pressure sores.

SUMMARY OF THE INVENTION

Known supports made of standard polyurethane foam do not provide even or well-distributed support of a body reclining thereon because of the polyurethane material. Such known standard supports have a spring-like characteristic that tends to return an increased reactive force in response to increasingly large forces on the support. Moreover, the greater the deflection of the polyurethane support, the greater the reactive force provided by the standard support. This spring-like characteristic is undesirable in the case of long-term patient care because the points at which the greatest pressure occurs are the points at which pressure sores can be formed.

Changing the density of the standard polyurethane foam used in such known supports does not improve the performance of such known supports. For example, use of a lower density foam requires a thicker, bulkier cushion or mattress, which can easily become unwieldy or unstable, and can still result in pressure points because of the inherent spring-like nature of the polyurethane foams. Also, if a sufficiently large force is applied to a support made of low density polyurethane foam, it is possible that the force will "bottom out" or act through the support and onto whatever structure lies below or behind the support.

The present invention therefore seeks to provide improved supports, such as mattresses and cushions, for pressure-relief.

According to the present invention there is provided a laminated support for pressure-relief comprising at least two layers of foam adhered together, wherein at least one layer is a visco-elastic foam.

In one embodiment, the laminated support comprises two layers of visco-elastic foam adhered together, wherein one layer of visco-elastic foam has a greater hardness than the other layer. The laminated support may further comprise a layer of polyurethane foam adhered to the layers of visco-elastic foam.

In another embodiment, the laminated support comprises a single layer of visco-elastic foam and a single layer of polyurethane foam adhered together.

The visco-elastic properties of the laminated support respond to a combination of body weight and body temperature. In particular, visco-elastic foam supports tend to soften when heated, and therefore tend to soften in response to body heat. As a result, relatively hard visco-elastic material will initially firmly support a body lying thereon and will soften at the pressure points. Thus, the support subsequently gently molds to the form of the body, allowing pressure to be absorbed uniformly and distributed evenly across the support. This property is of particular benefit in the prevention and healing of pressure sores.

Other features and advantages of the invention will become apparent to those skilled in the art upon review of the following detailed description, claims and drawings.

Figure 1:
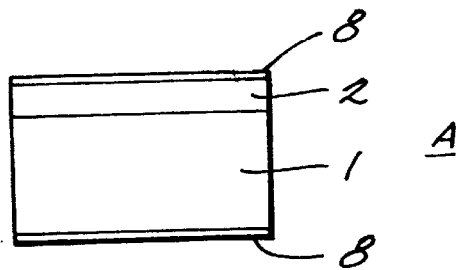
FIG. 1 shows a side view of a support embodying the present invention.

Before one embodiment of the invention is explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein are for the purpose of description and should not be regarded as limiting.

DETAILED DESCRIPTION OF THE PREFERRED EMBODIMENT

Figure 5:
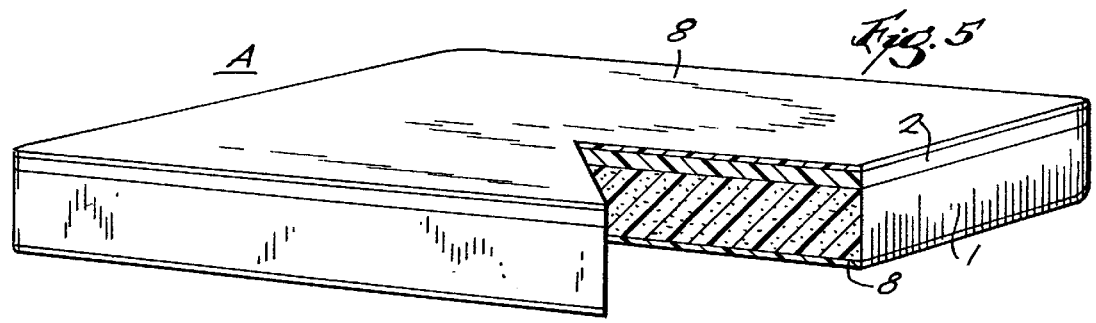
FIG. 5 is a perspective view in partial cross section of the support shown in FIG. 1.

The support or cushion A shown in FIGS. 1 and 5 includes a bottom layer 1 of 40 mm thick visco-elastic foam having a density of 110 kg/m$^3$ and a hardness of 30N, and a top layer 2 of 10 mm thick visco-elastic foam having a density of 85 kg/m$^3$ and a hardness of 10N.

Figure 2:
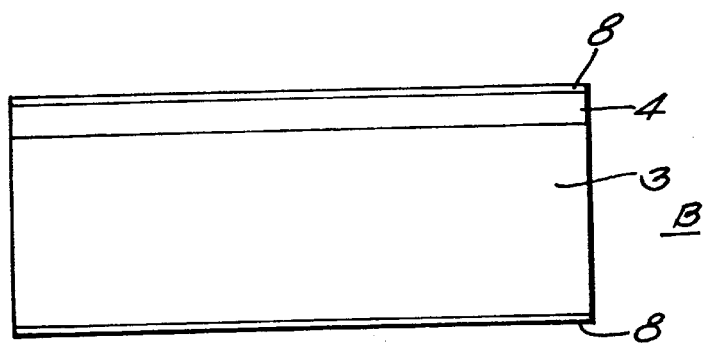
FIG. 2 shows a side view of a support that is an alternative embodiment of the present invention.
Figure 6:
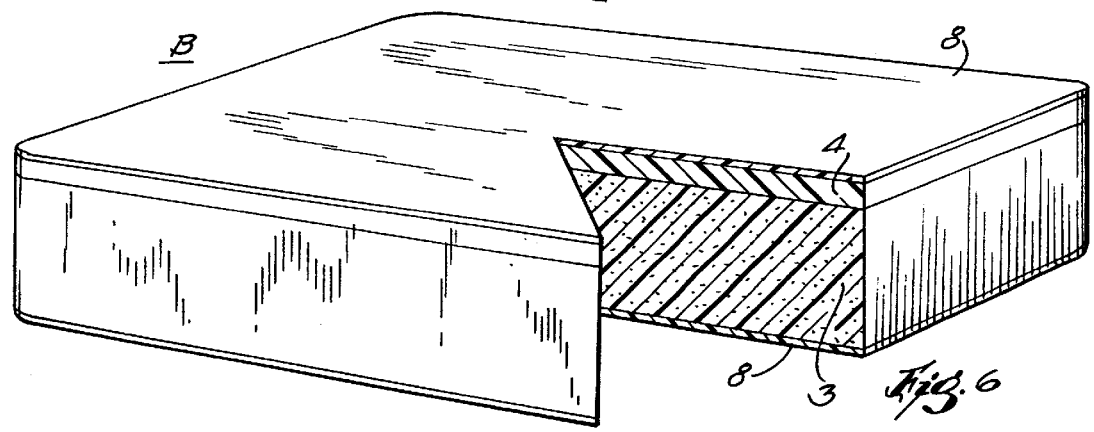
FIG. 6 is a perspective view in partial cross section of the support shown in FIG. 2.

The support B shown in FIGS. 2 and 6 is well-suited for use as an overlay which can be placed on top of an existing mattress to provide extra comfort and pressure-relief. The overlay B includes a bottom layer 3 of 60 mm thick visco-elastic foam having a density of 83 kg/m$^3$ and a hardness of 13N, and a top layer 4 of 10 mm thick visco-elastic foam having a density of 83 kg/m$^3$ and a hardness of 10N. A support similar to the construction of support B could also be manufactured to include a bottom layer of 80 mm thick highly resilient polyurethane foam having a density of 35 kg/m$^3$ and a hardness of 12N, and a top layer of 70 mm thick visco-elastic foam having a density of 82 kg/m$^3$ and a hardness of 13N.

Figure 3:
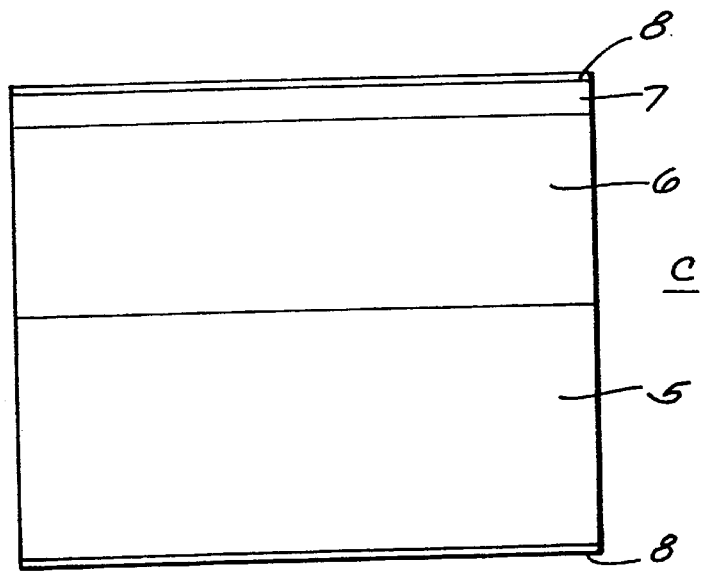
FIG. 3 shows a side view of a support that is a second alternative embodiment of the present invention.
Figure 7:
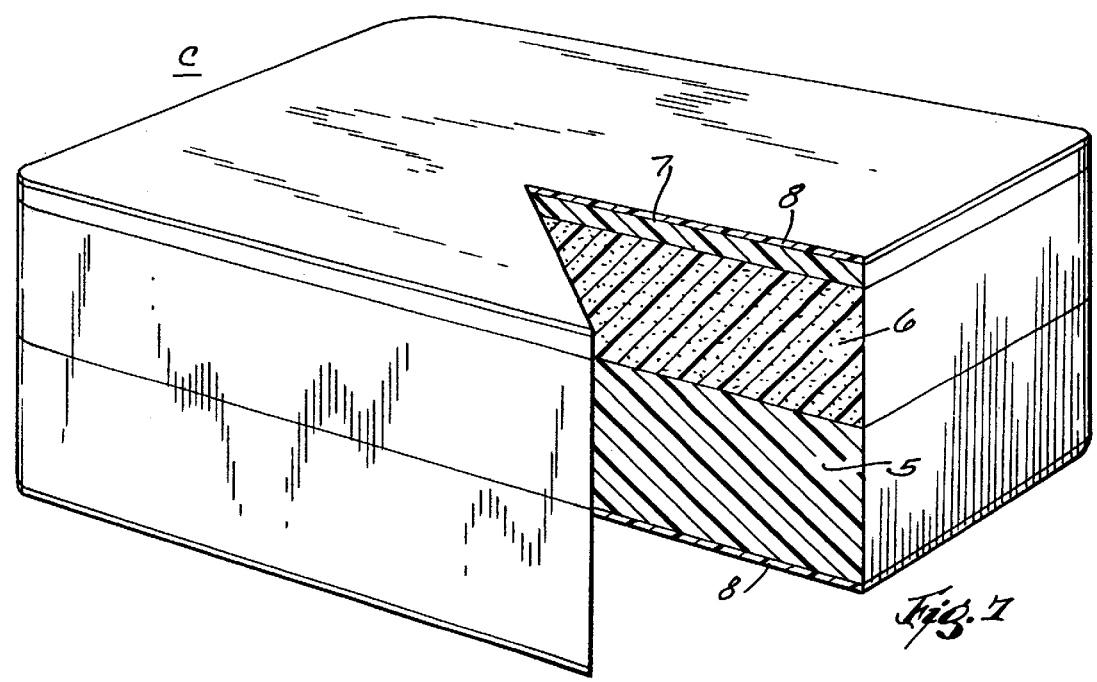
FIG. 7 is a perspective view in partial cross section of the support shown in FIG. 3.

The support C shown in FIGS. 3 and 7 is well-suited for use as a mattress and includes a bottom layer 5 of 75 mm thick polyurethane foam having a density of 35 kg/m$^3$, a middle layer 6 of 60 mm thick visco-elastic foam having a density of 83 kg/m$^3$ and a hardness of 13N, and a top layer 7 of 10 mm deep visco-elastic foam having a density of 83 kg/m$^3$ and a hardness of 10N.

Suitable polyurethane foams are manufactured by A/S Dan-Foam, 5560 Arup, Denmark. One example of a polyurethane foam has the manufacturer's code HE35S.

Similarly, suitable visco-elastic foams are made by A/S Dan-Foam, 5560 Arup, Denmark and sold under the trade mark TEMPUR. One such visco-elastic foam has the manufacturer's code T-85. A preferred range of density of the visco-elastic foam is 50 to 120 kg/m$^3$.

For each of the above embodiments A, B, and C, the layers comprising the cushion, overlay or mattress, are adhered together using an environmentally-friendly water-based adhesive such as SABA AQUABOND RSD (trade mark), a two-component water-based adhesive produced by SABA DINXPERLO BV, B-7090 AA DINXPERLO, Belgium. Hardness is to be measured 65% compression at 20° C.

For each of the above embodiments A, B, and C, the layers comprising the cushion, overlay or mattress, once the appropriate layers of foam have been adhered together, a 2 mm thick sheet 8 of a reticulated filter polyurethane foam is adhered to each outer face of the laminated support. This layer 8 is air permeable.

Figure 4:
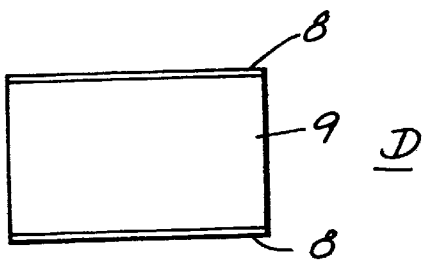
FIG. 4 shows a side view of a support that is a third alternative embodiment of the invention.

The support D illustrated by FIG. 4 includes a single layer of visco-elastic foam sandwiched between two layers of reticulated filter polyurethane foam. In particular, the support D includes a sheet of visco-elastic foam 9, which is sandwiched between two sheets of reticulated polyurethane foam 8. The sheet of visco-elastic foam 9 preferably has a thickness ranging from 50 mm to 100 mm, a density ranging from 50 kg/m$^3$ to 120 kg/m$^3$, and a hardness ranging from 10N to 30N measured at 65% compression at 20° C.

Any of the supports A, B, C, and D may be provided with an outer covering (not shown). Two examples of outer coverings are described below.

One example is a textile net cover followed by a removable outer fabric cover. The textile net cover eases the taking on and off of the fabric cover and is made from a specially treated textile which allows the foam layers to 'breathe' whilst preventing contamination of the foam layers by fluids. An example of such netting is the 100% cotton netting manufactured by BIDET & HORST GmbH & Co KG, D-4460 Hörstel, Germany.

A second example of an outer covering is a waterproof, vapor-permeable cover made of base nylon fabric coated with polyurethane film. Preferably, this cover material is 0.25 mm thick, weighs 245 g/m$^2$, and is constructed having a single sheet top surface, no joins, welded seams and a sealed zip flap. In addition, this cover may be pretreated with an anti-bacterial agent.

The laminated support of the present invention, when covered with the polyurethane coat nylon material ensures good hygiene for patients with incontinence. The elasticity of the cover allows the pressure-relieving properties of the visco-elastic foam to be unimpaired.

Laminated supports manufactured in accordance with the present invention allow air to circulate around a patient's skin and thus avoid the discomfort of perspiration and skin irritation.

The visco-elastic foam layers provide the laminated support with its special pressure-relieving properties. The support is thus able to mould according to the weight and temperature of a body in contact therewith. When the body is moved from a particular point of contact, the support quickly regains its initial shape, ready to be re-molded.

This property of the support is different from normally polyurethane foams which bulk up when compressed, thereby exerting pressure rather than relieving it. As a result, the quality of sleep of a person reclining on a support constructed of layers of foam having visco-elastic properties is different from normal polyurethane foams which bulk up when compressed, thereby exerting pressure rather than relieving it.

In use, it is the side of the support which has the visco-elastic foam layer, or the softest visco-elastic foam layer, foremost which is arranged for contact with a person's body. As a result, the support does not need to be turned, as is customary with hospital mattresses, for example.

Various features of the invention are set forth in the following claims.

What is claimed is:

1. A laminated support for pressure-relief comprising:

a first layer of visco-elastic foam;

a second layer of visco-elastic foam adhered to the first layer of visco-elastic foam, the second layer of visco-elastic foam having a greater hardness than the first layer of visco-elastic foam;

a layer of polyurethane foam adhered to the second layer of visco-elastic foam;

a first layer of reticulated filter polyurethane foam adhered to the first layer of visco-elastic foam; and a second layer of reticulated filter polyurethane foam adhered to the layer of polyurethane foam.

2. A laminated support as claimed in claim 1, further comprising a waterproof vapor-permeable outer cover.

* * * * *